Figure 1:
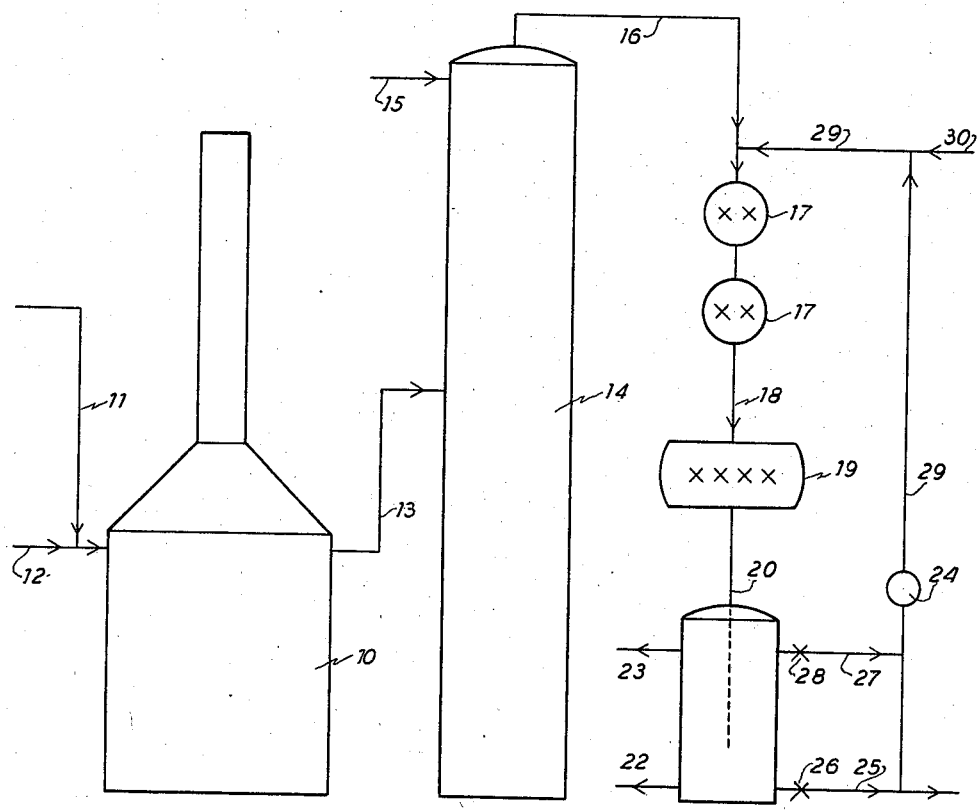

JOHN C. BOLINGER
WAYNE A. HOWARD
PARK WOOLLEY
INVENTORS

Patented June 20, 1939

2,162,933

UNITED STATES PATENT OFFICE 2,162,933

METHOD OF PROTECTING CONDENSER TUBES AND THE LIKE FROM CORROSION OR SALT DEPOSITION

John C. Bolinger, West Hollywood, Wayne A. Howard, Whittier, and Park Woolley, Huntington Park, Calif., assignors to Socony-Vacuum Oil Company, Incorporated, New York, N. Y., a corporation of New York Application August 23, 1937, Serial No. 160,476

3 Claims. (Cl. 196—93)

It is common practice in the operation of tube stills, and in particular in the operation of cracking tube stills, to add lime to the oil charged to the still for the purpose of protecting the equipment against magnesium chloride and sulfur corrosion. It is also common practice to inject anhydrous ammonia into the top of bubble towers in which the vapors from such stills are fractionated mainly to neutralize any hydrochloric acid formed by the hydrolysis of magnesium chloride in the still. It is also known in the art to inject ammonium hydroxide or solutions of ammonia in water at a point in the condensing system where water is normally liquefied.

We have found that the addition of lime to the crude oil entering the heating coils does not materially reduce the amount of hydrochloric acid vapors carried over from the top of bubble towers into the heat exchangers and condensing system. It has been our experience, however, that there is considerable advantage in the use of anhydrous ammonia introduced into the top section of fractionating towers. The $NH_3$ gas combines with the HCl to form $NH_4Cl$, which is much less corrosive, especially in the temperature range of roughly 250° F. to 450° F. at substantially atmospheric pressure in the absence of liquid water. Under these conditions ammonium chloride vapors (or solid particles) coming in contact with metal at temperatures below 250° F. or thereabouts, such as the tubes in heat exchangers, condensers, and coolers, condense and adhere to the surface, forming corrosive deposits of a complex nature containing, besides ammonium chloride, sulfides, naphthanates and other organic substances. As an example, an analysis of such a deposit formed on the inlet ends of Admiralty metal condenser tubes is as follows:

|  | Per cent |
|---|---|
| Copper | 40 |
| Zinc | 17 |
| Sulfur | 24 |
| Chlorin | 7 |
| $H_2O$ and organic | 4 |
| Undetermined, mostly $NH_3$ | 8 |

The copper and zinc in the deposit are mainly present as sulfides and have been formed by a complex corrosion reaction on the tube, the details of which are not entirely known.

Usually the temperature and pressure (often a few pounds above atmospheric) at the point of deposit are such that the water vapor carried in the vapor from a topped crude oil does not become liquid until further along in the condenser. The metal temperature of the tubes is also usually such that sufficient water for hydrolysis is absorbed by the deposit and rapid corrosion takes place, partly because the acid character of the salts destroys the protective coating of sulfides that would otherwise be more durable. Excess ammonia does not materially benefit this condition because the excess is swept on past the deposit by the vapors and organic liquids.

In the above explanation the importance of ammonium chloride may be over-stressed, especially for conditions in some plants; however, we wish to point out the complex nature of corrosion reactions in general and the practical impossibility of stating definitely the exact mechanism of corrosion. Other ammonium salts such as the sulfide and carbonate undoubtedly play a part in establishing the overall corrosion rate. Also, the catalytic effect of many salts on corrosion, and especially of ammonium salts in the formation of copper and other metallic sulfides, should be mentioned. Also, copper-zinc alloys are attacked by strongly alkaline solutions such as are formed when small amounts of moisture condense in the presence of relatively large quantities of ammonia.

We have found that, either with or without the addition of ammonia or lime as mentioned above, excessive corrosion often takes place in the condensing system and particularly in the vapor exchangers and on the inlet ends of the condenser tubes. When ammonia is used corrosive deposits form as described above and when it is not used, the highly acid vapors destroy the protective coating of metallic sulfides which would otherwise remain in place, thereby exposing fresh metal to further attack.

We have also found that these salts may continuously be removed and their collection prevented by introducing liquid water into the vapor line just ahead of the heat exchanger or condenser into which it discharges. Sufficient water (or wet steam) is added to lower the temperature to that at which liquid water is present in the zone of salt deposition under the existing pressure in the system. This water washes away and dissolves the salts as they tend to deposit, prevents their accumulation, and positively stops corrosion from this source, at substantially no cost whatever. When ammonia is not used, the water serves to absorb and dilute the acid vapors.

Figure 2:
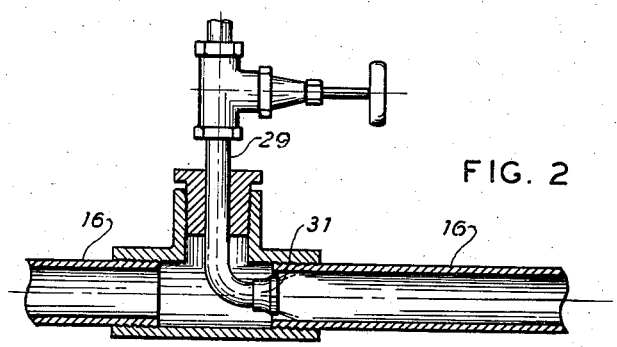

The accompanying drawing illustrates the application of the method herein described, Fig. 1 showing diagrammatically a conventional layout for a crude oil distillation plant, with indications of the points where corrosion is likely to occur by reason of deposition of corrosive salts, while Fig. 2 is a drawing, partly in section and partly in elevation, of a simple device for introducing the water or other solvent liquid.

Referring to Fig. 1, 10 is a furnace containing tubes in which the oil entering through pipe 11 is heated and partially vaporized. Ammonia may be admitted through pipe 12 into the coil inlet or farther along in the system, as may be preferred. The hot oil and vapors pass through pipe 13 into a flash and fractionating tower 14 in which vapors are separated from residue. Ammonia may be admitted into the top of the tower, as at 15, or elsewhere as may be desired.

The vapors pass through pipe 16 to a series of heat interchangers indicated at 17—17, in which the deposition of ammoniacal salts is likely to occur, the partially cooled vapors passing then through pipe 18 to a condenser 19 which also may accumulate deposits of corrosive salts. The condensate finally passes through pipe 20 to a trap or separator 21 from which water is withdrawn as at 22 and condensed oil as at 23. A pump 24 may be used to lift water from the bottom of the separator through pipe 25 controlled by valve 26, or if the deposit be oil soluble, the circulation may be of oil withdrawn through pipe 27 controlled by valve 28. In either case the liquid is directed through pipe 29 into pipe 16 at a point ahead of the first heat interchanger 17, the earliest point in the system in which corrosive salts are likely to accumulate. If preferred, the water or other solvent may be introduced at the same point, as through pipe 30, from any extraneous source.

Referring to Fig. 2, the solvent liquid passes through pipe 29 into a spray nozzle 31 placed inside pipe 16. This nozzle preferably directs the liquid in thin sheets or streams against the wall of the pipe, or it may be misted into the entire vapor stream.

The amount of water so added is too small to produce any material condensation of vapor, and its effect is expended in dissolving and diluting salts which would otherwise tend to deposit further along in the cooling system.

It will be understood that this description is purely exemplary and illustrative, and not limiting in any sense except as to the point of injection of the water or other liquid, which must be upstream from the point at which deposits tend to collect when the liquid is not used. It is desirable, however, to inject water at a point as close as possible to the initial point of salt deposition.

The quantity of water required cannot be foretold as it depends not only on the quantity, temperature, and pressure of vapor passing into the cooling unit but also on the quantity of salt forming material carried by the vapors. The minimum quantity required to prevent corrosion may readily be found by gradually reducing the supply until deposition begins to be noticed, or test pieces can be placed in the condensers and the rates of corrosion determined with varying amounts of water. In the specific instance in which we have successfully used this method, a 15,000 barrel crude distillation unit handling California crude treated with 0 to 300 pounds of lime per day and with 0 to 20 pounds of anhydrous ammonia added to the top of the bubble tower was freed from interchanger and condenser corrosion by the injection of 5 gallons of water per minute.

It will be noted that this injection does not alter the duty of the condensing apparatus, inasmuch as the water enters and leaves the condenser in the liquid form and at substantially identical temperatures. Also, by removing the deposit the efficiency of the heat exchangers and condensers is considerably increased.

If desired, additional protective or neutralizing agents such as sodium carbonate, calcium hydroxide or alkaline cooling tower water may be used.

The process herein disclosed is applicable wherever similar conditions are present, and by specifying the removal of salts formed under these conditions we do not wish to limit the application to gasoline vapor condensing systems only. Nor do we wish to restrict the application to the use of water as the only solvent. Under different conditions and with a water insoluble deposit, an organic or other liquid might be substituted.

We claim as our invention:

1. In an oil distillation process which includes the injection of ammonia into the oil distillation system, the method of preventing corrosion of equipment for the indirect cooling of oil vapors which comprises: injecting liquid water into conductors conveying said vapors at a point in the system upstream of the point of entry of said vapors into said equipment but within the zone wherein at least a substantial portion of said water will remain liquid.

2. In an oil distillation process which includes the injection of ammonia into the oil distillation system, the method of protecting equipment for the indirect cooling of oil vapor from corrosion due to deposition of salts therein which comprises: introducing to the zone in said equipment in which said salts would normally deposit a supply of liquid water in quantity sufficient to dissolve said salts and to thereby prevent said deposition, and mainttaining at least a substantial portion of said injected water in the liquid state.

3. In an oil distillation process which includes the injection of ammonia into the oil distillation system, the method of continuously removing corrosive solids from equipment for the indirect cooling of oil vapor by the continuous addition of a stream of a solvent for said solids which remains liquid at the temperature and pressure obtaining in said equipment.

JOHN C. BOLINGER.
WAYNE A. HOWARD.
PARK WOOLLEY.